UNITED STATES PATENT OFFICE.

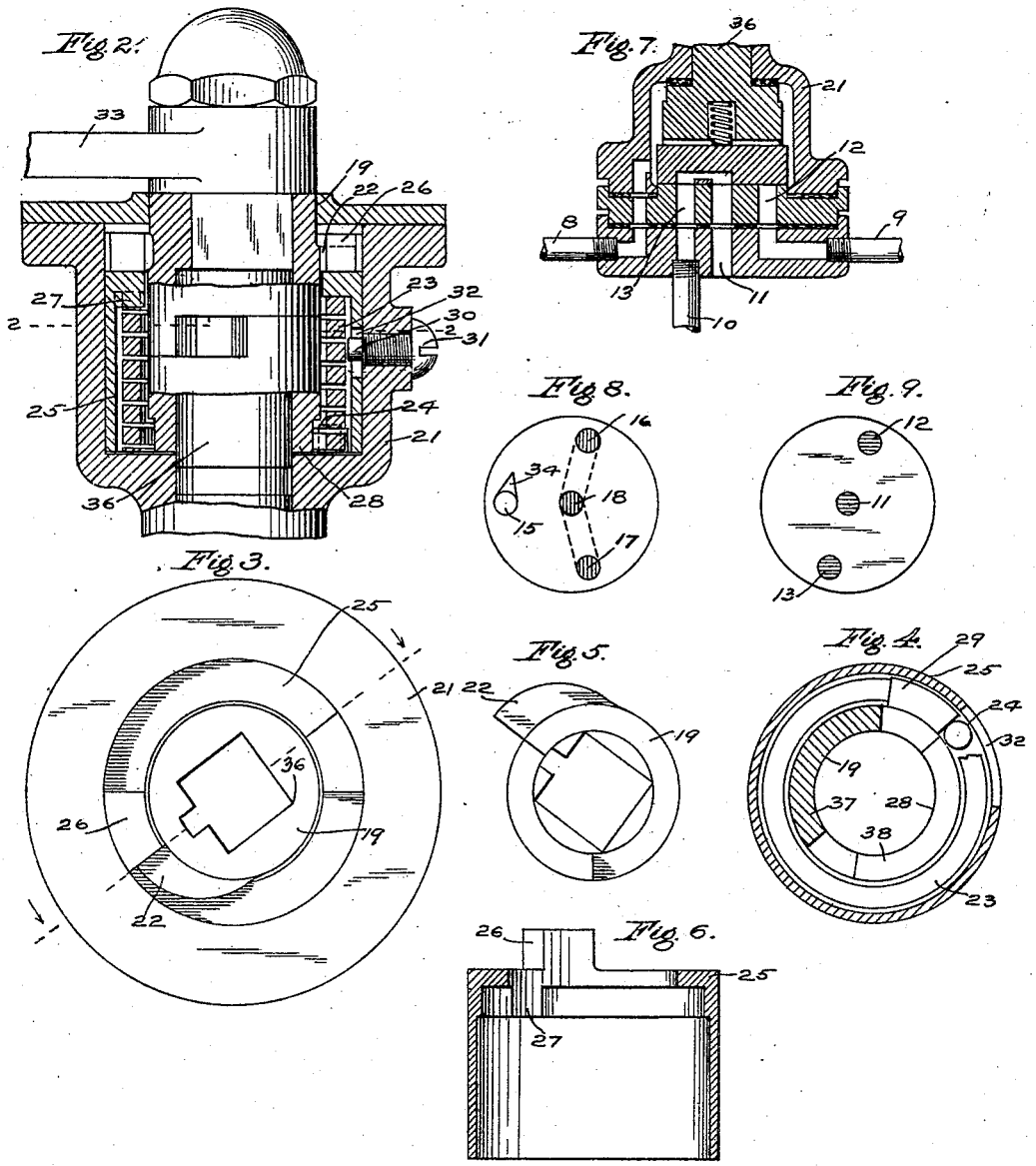

WALTER V. TURNER, OF EDGEWOOD, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

BRAKE-VALVE DEVICE.

No. 929,054.　　　　　Specification of Letters Patent.　　　　Patented July 27, 1909.

Application filed November 1, 1907. Serial No. 400,181.

To all whom it may concern:

Be it known that I, WALTER V. TURNER, a citizen of the United States, residing at Edgewood, in the county of Allegheny and State of Pennsylvania, have invented new and useful Improvements in Brake-Valve Devices, of which the following is a specification.

This invention relates to fluid pressure brakes, and more particularly to a brake valve having means for normally opposing the movement of the valve to one or more positions thereof.

The principal object of my invention is to provide a brake valve having means wherein a single resistance spring is utilized for opposing the movement of the valve to either one of the two positions thereof.

Though my invention is adapted for general use, it is designed to be employed particularly in connection with a fluid pressure brake system, wherein an automatic valve device is provided, which is operated by variations in train pipe pressure for applying and releasing the brakes, and a brake valve, having positions for independent release, slow application and rapid application. The brake valve being preferably provided with a port for controlling the exhaust from the automatic valve device.

In an apparatus of this character, my invention is employed for opposing the movement of the brake valve to the independent release position, preferably from the position in which the exhaust from the automatic valve device is open, and also the movement of the brake valve to its rapid application position, preferably from its slow application position.

In the accompanying drawing, Figure 1 is a diagrammatic view of a combined automatic and straight air brake equipment for a locomotive, with my improvements applied thereto; Fig. 2 a central sectional view of the upper portion of my improved straight air brake valve, taken substantially on the line 1—1 of Fig. 3; Fig. 3 a top plan view of the same, with the cover plate and handle removed; Fig. 4 a horizontal sectional view of the brake valve, taken substantially on the line 2—2 of Fig. 2; Fig. 5 a bottom plan view of the upper and inner lug collar of my improved brake valve; Fig. 6 a central sectional view of the outer sleeve for same; Fig. 7 a central sectional view of the lower portion of the brake valve, showing the location of the ports and passages; Fig. 8 a face view of the rotary valve for same, and Fig. 9 a plan view of the seat for the rotary valve, showing the position of the ports therein.

In Fig. 1 is illustrated a combined automatic and straight air brake equipment for a locomotive, comprising an engineer's automatic brake valve 1, train pipe 2, main reservoir 3, triple valve 4, auxiliary reservoir 5, brake cylinder 6, and straight air brake valve 7, having a main reservoir supply pipe 8, direct brake cylinder application and release pipe 9, and pipe 10 leading to the exhaust port of the triple valve 4. The valve seat of the straight air brake valve may be provided with ports as shown in Fig. 9, namely port 11 to the atmosphere, port 12, leading to the direct brake cylinder pipe 9, and port 13, leading to the triple valve exhaust pipe 10, and the supply pipe 8, opening into the rotary valve chamber. The rotary valve 14 is provided with a through port 15 for supplying air from the reservoir to the brake cylinder, and is also provided with exhaust cavities 16 and 17, leading to the central cavity 18, which registers with the exhaust port 11. In the normal triple valve release position of the straight air brake valve, port 17 registers with port 13, leading to the triple valve exhaust, so that in this position, the triple valve exhaust is open to the atmosphere, through the exhaust port 11. In another position of the rotary valve, the port 16 registers with the direct brake cylinder port 12, so that in this position air may be released directly from the brake cylinder, through the pipe 9.

The means for returning the rotary valve from direct brake cylinder release position to the normal triple valve release position comprises a spiral spring 23, preferably of square wire, and contained within the valve casing 21. The free movement of the spring 23 is limited in one direction by a fixed stop or pin 24, secured to the interior bottom face of the valve casing, and the upper end of the spring 23 is adapted to engage a downwardly projecting lug 27, secured to a movable sleeve 25, mounted within the valve casing 21. The sleeve 25 is also provided with an upwardly extending lug 26, which is adapted to be engaged by a lug 22, secured to a collar 19.

The collar 19 is mounted within the sleeve 25, and is secured to, and therefore moves with, the valve handle 33, so that the several lugs and the fixed stop 24, being properly located in the desired relative positions, upon movement of the valve handle to the triple valve release position, the lug 22 on the collar 19 engages the lug 26 on sleeve 25, lug 27 engages the upper end of the spring, and the lower end of the spring is stopped by the fixed pin 24. Consequently, further movement of the handle toward the direct brake cylinder exhaust position is resisted by the action of the spring, and the rotary valve and handle tend to return to the normal triple valve exhaust position.

The direct brake cylinder supply port 15 may be provided with a V shaped cavity extension 34, and in the slow service position this extension 34 registers with the brake cylinder port 12. In order to utilize the same spring 23 for returning the rotary valve from the quick to the slow service position, I further provide a collar 28, which may be loosely mounted on the rotary valve stem 36, and which is provided with a radially extending lug 29, adapted to engage the lower end of the spring 23, being interposed between said spring and the fixed stop 24. The adjacent ends of the collars 19 and 28 are partly cut away, leaving flanges or lugs 37 and 38 respectively. The flange of one collar fitting into the cut away portion of the other collar, so that the movement of the flange 37 actuates the flange 38 and turns the collar 28. It will thus be seen that movement of the handle in one direction turns the collar 19 and the collar 28, with the lug 29, which bears against the lower end of the spring 23. The upper end of the spring engages the lug 27 on the sleeve 25, and in order to hold that end of the spring, where the lug 29 is moved against the lower end of the spring, a fixed stop 30 is provided, which may be the extension of a screw 31 and which projects inwardly from the side wall of the valve casing, and within a slot 32 in the sleeve 25, so that, when the spring is pressed against the lug 27 of the sleeve, the same rotates until the stop 30 engages one end of the slot 32. Further movement of the lug 29 is then effected against the resistance of the spring 23, as will be apparent.

The flanges 37 and 38 and the relative arrangement of the slot 32 and stop 30 are such that upon movement of the brake valve handle 33 in the direction to apply the brakes, the lost motion between the flanges 37 and 38 is taken up and flange 37 engages flange 38, which, through the lug 29 turns the spring 23 and sleeve 25, and at the slow application position, further free movement of the spring is prevented by the engagement of the stop 30 in slot 32, so that movement to quick application position is subject to the resistance of the spring 23.

It will now be apparent that I have provided means whereby a single spring is utilized for the purpose of yieldingly resisting the movement of the rotary valve and handle to either one of two positions thereof.

Having now described my invention, what I claim as new and desire to secure by Letters Patent is:—

1. In a fluid pressure brake, the combination with a brake valve for applying and releasing the brakes, of a resistance spring for opposing the movement of said brake valve to either one of two positions thereof, according to the direction of movement.

2. In a fluid pressure brake, the combination with a brake valve for applying and releasing the brakes, of a single resistance spring for normally opposing the movement of said brake valve in either direction of movement.

3. In a fluid pressure brake, the combination with a brake valve for applying and releasing the brakes, of a single resistance spring for normally opposing the movement of said brake valve to either one of two positions from one of two other respective positions thereof.

4. In a fluid pressure brake, the combination with a brake valve for applying and releasing the brakes, of a resistance spring, and fixed stops for limiting the free movement of said spring, whereby said spring is adapted to oppose the movement of said brake valve to either one of two positions thereof.

5. In a fluid pressure brake, the combination with a brake valve for applying and releasing the brakes, of a resistance spring, and fixed stops for limiting the free movement of said spring in opposite directions, whereby said spring is adapted to oppose the movement of said brake valve in either direction to a predetermined position.

6. In a fluid pressure brake, the combination with a brake valve for applying and releasing the brakes, of a resistance spring, and movable means, operated by the brake valve, for engaging one end of the spring in either direction of movement of said brake valve and a coacting fixed stop for engaging the other end of the spring and thereby oppose the movement of the brake valve to two different positions in opposite directions.

7. The combination with a brake valve handle, of a spring, a member operated by said handle and having a lug adapted to engage one end of the spring, a stop for the opposite end of the spring, to cause the spring to yieldingly resist movement of the handle in one direction, a stop for limiting the movement of said member and thereby the spring in the opposite direction, and means operated by said handle and adapted to engage the opposite end of the spring, thereby causing the spring to yieldingly resist movement of the handle in said opposite direction.

In testimony whereof I have hereunto set my hand.

WALTER V. TURNER.

Witnesses:
R. F. EMERY,
WM. M. CADY.